(12) United States Patent
Gettemy et al.

(10) Patent No.: US 8,049,744 B2
(45) Date of Patent: *Nov. 1, 2011

(54) METHOD AND APPARATUS FOR SELECTABLE DISPLAY MODE FOR INTELLIGENTLY ENHANCING BATTERY LIFE

(75) Inventors: Shawn Gettemy, San Jose, CA (US); Anthony Kim, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 27 days.

This patent is subject to a terminal disclaimer.

(21) Appl. No.: 12/613,354

(22) Filed: Nov. 5, 2009

(65) Prior Publication Data

US 2010/0277454 A1    Nov. 4, 2010

Related U.S. Application Data

(63) Continuation of application No. 11/253,487, filed on Oct. 18, 2005, now Pat. No. 7,616,197, which is a continuation of application No. 10/358,047, filed on Feb. 3, 2003, now Pat. No. 7,002,569, which is a continuation of application No. 09/649,999, filed on Aug. 28, 2000, now Pat. No. 6,603,469.

(51) Int. Cl.
*G06F 3/038* (2006.01)
*G09G 5/00* (2006.01)

(52) U.S. Cl. ...................... 345/211; 345/102

(58) Field of Classification Search ............ 345/82–100, 345/211–213
See application file for complete search history.

(56) References Cited

U.S. PATENT DOCUMENTS

| 5,854,617 A | * | 12/1998 | Lee et al. | 345/102 |
| 5,944,829 A | * | 8/1999 | Shimoda | 713/324 |
| 6,184,875 B1 | * | 2/2001 | Matsuura | 345/211 |
| 7,038,641 B2 | * | 5/2006 | Hirota et al. | 345/83 |

* cited by examiner

*Primary Examiner* — Bipin Shalwala
*Assistant Examiner* — Steven Holton

(57) ABSTRACT

A method and system for enhancing the life of a battery within a portable or otherwise battery operated electronic device. The method and system provide selectable display modes, e.g., from color to monochrome, that can be changed in order to enhance the life of the device's battery. The monochrome display mode can be selected by the when the battery level is detected below a predefined threshold. In one embodiment, the electronic device is a hand held computer system with a display device. When the battery level is detected as below a preselected level, a message may be generated on the computer display screen. The display mode can change from color to monochrome thereby saving power because the monochrome display. In one embodiment, color sequential techniques are used to provide a flat panel color display. Within the display, a transreflective layer provides reflective light for monochrome applications. When the battery energy returns to normal levels, the color display mode can be re-entered automatically. It is appreciated that the display mode changes can also be performed automatically if the battery level falls below certain critical levels.

17 Claims, 13 Drawing Sheets

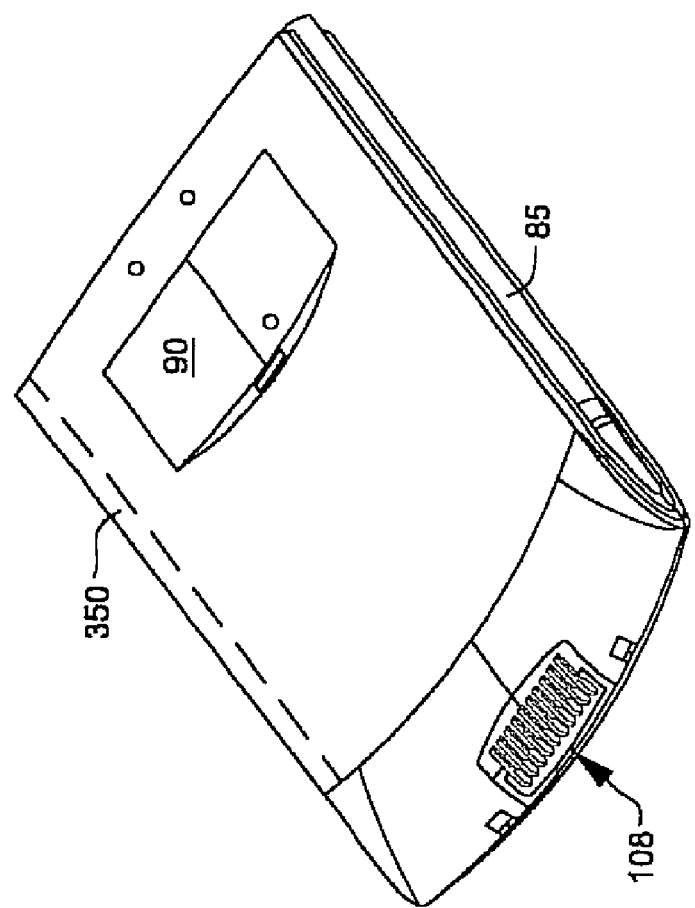

60

400 Cont

105a

METHOD AND APPARATUS FOR SELECTABLE DISPLAY MODE FOR INTELLIGENTLY ENHANCING BATTERY LIFE

RELATED APPLICATIONS

This is a Continuation Application of commonly owned U.S. patent application Ser. No. 11/253,487, now U.S. Pat. No. 7,616,197, filed Oct. 18, 2005, to Gettemy and Kim, which in turn is a continuation application of U.S. Pat. No. 7,002,569, filed Feb. 3, 2003, which is turn is a continuation application of U.S. Pat. No. 6,603,469, filed Aug. 28, 2000. All such applications are hereby incorporated by reference herein in their entirety.

FIELD OF INVENTION

The present invention relates to the field of computer systems that are battery operated and have display screens. More specifically, the present invention relates to portable electronic devices and systems.

RELATED ART

As the components required to build a computer system have reduced in size, new categories of computer systems have emerged. One of the new categories of computer systems is the "palmtop" computer system. A palmtop computer system is a computer that is small enough to be held in the hand of a user and can therefore be "palm-sized." Most palmtop computer systems are used to implement various Personal Information Management (PIM) applications such as an address book, a daily organizer and electronic notepads, to name a few. Palmtop computers with PIM software have been know as Personal Digital Assistants (PDAs). Many PDAs have a small and flat display screen associated therewith.

In addition to PDAs, display screens have also been implemented within other portable electronic devices, such as cell phones, electronic pagers, remote control devices and other wireless portable devices.

These portable electronic devices, such as PDAs, are often battery powered. Some portable electronic devices utilize rechargeable batteries and others use cells that need to be replaced after some limited period of use. As portable electronic devices become more complex electronically, their power consumption rates have also increased. Because they have limited battery energy, some PDAs and other electronic devices, such as cells phone, electronic pagers, etc., have relatively short operational periods between which battery replacements or recharging is required. With respect to rechargeable PDAs, cell phones, electronic pagers, etc., they typically have little more than a day of stored battery energy before they need to be recharged. Therefore, it would be desirable to provide an electronic device having a screen that functioned in a way to enhance the device's battery life.

Certain PDAs manage their battery life in an intelligent manner. For instance, if the battery life of certain PDAs falls below a predetermined low level, the user is given a screen message indicating that a battery recharge or replacement is needed and should be done right away. In this manner, the user can perform corrective action before any information is lost. Therefore, it would be desirable to provide an electronic device having a screen that enhanced and managed the device's battery life in an intelligent manner.

Some color flat panel displays utilize a back lighting element, such as a cold cathode fluorescent (CCF) tube. These elements consume a relatively large amount of energy from a battery operated device. It would be desirable to provide an electronic device that offered a color display but also managed the device's battery life in an intelligent manner.

SUMMARY OF THE INVENTION

Accordingly, embodiments of the present invention provide an electronic device, e.g., a cell phone, PDA, electronic pager, etc., having a screen also that functions in a way to enhance the device's battery life. Embodiments also provide an electronic device having a screen that also enhances and manages the device's battery life in an intelligent manner. Embodiments also provide an electronic device that offers a multi-mode color display that also manages the device's battery life in an intelligent manner. The present invention provides these advantages and others not specifically mentioned above but described in the sections to follow.

A method and system are described herein for enhancing the life of a battery within a portable or otherwise battery operated electronic device. The method and system provide user selectable display modes, e.g., from color to monochrome, that can be changed in order to enhance the life of the battery. In one embodiment, monochrome display mode consumes less power than color display mode. For instance, the monochrome display mode can be selected by the user when the battery level is detected as falling below a predefined threshold. In one embodiment, the electronic device is a hand held computer system with a multi-mode display device. When the battery level is automatically detected as falling below a preselected level, a message is generated on the computer display screen. The message informs the user that the display mode of the screen can be changed to enhance the battery life. If selected, the display mode can change from color to monochrome thereby saving power because the monochrome display does not utilize a back-lighting element. In one embodiment, color sequential techniques are used to provide a flat panel color/monochrome display. Within the display, a transreflective layer provides reflective light for monochrome applications and bright light color applications. When the battery energy returns to normal levels, the color display mode can be re-entered automatically. It is appreciated that the display mode changes can also be performed automatically if the battery level falls below certain critical levels.

More specifically, an embodiment of the present invention includes a portable electronic device comprising: a battery; a processor coupled to bus; an input device coupled to the bus; a multi-mode display device coupled to the bus; a memory unit coupled to the bus wherein the memory unit contains processor instructions that when executed implement a method of enhancing battery life comprising the steps of: a) detecting a battery energy level of the portable electronic device below a first predetermined level, wherein the portable electronic device has a multi-mode display device; b) in response to step a), placing the multi-mode display device into a monochrome display mode to enhance remaining battery life of the portable electronic device; c) detecting the battery energy level of the portable electronic device above a second predetermined level; and d) in response to step c), placing the multi-mode display device into a color display mode.

Embodiments include the above and wherein the multi-mode display device comprises: a) selectively energized multi-color lighting elements; b) a color flat panel display layer utilizing color sequential scanning processes; and c) a transreflective layer positioned between the multi-color lighting elements and the color flat panel display layer. Embodiments include the above and wherein the step b) of the method comprises the steps of: b1) displaying a message on the multi-mode display device indicating a low battery state and also indicating a user selection between color and monochrome display modes; and b2) in response to a user selection of the monochrome display mode, placing the multi-mode display device into the monochrome display mode and wherein the step b) further comprises the step of b3) automatically placing the multi-mode display device into the monochrome display mode, regardless of the user selection, provided the battery level is below a predetermined critical low level.

BRIEF DESCRIPTION OF THE DRAWINGS

The accompanying drawings, which are incorporated in and form a part of this specification, illustrate embodiments of the present invention and, together with the description, serve to explain the principles of the invention:

FIG. 2B is a bottom side perspective view of the palmtop computer system of FIG. 2A.

DETAILED DESCRIPTION

In the following detailed description of the present invention, a method and system for providing user selectable display modes for a multi-mode display screen in order to intelligently enhance battery life for a battery powered electronic device, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "checking," "accessing" "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

Figure 1:
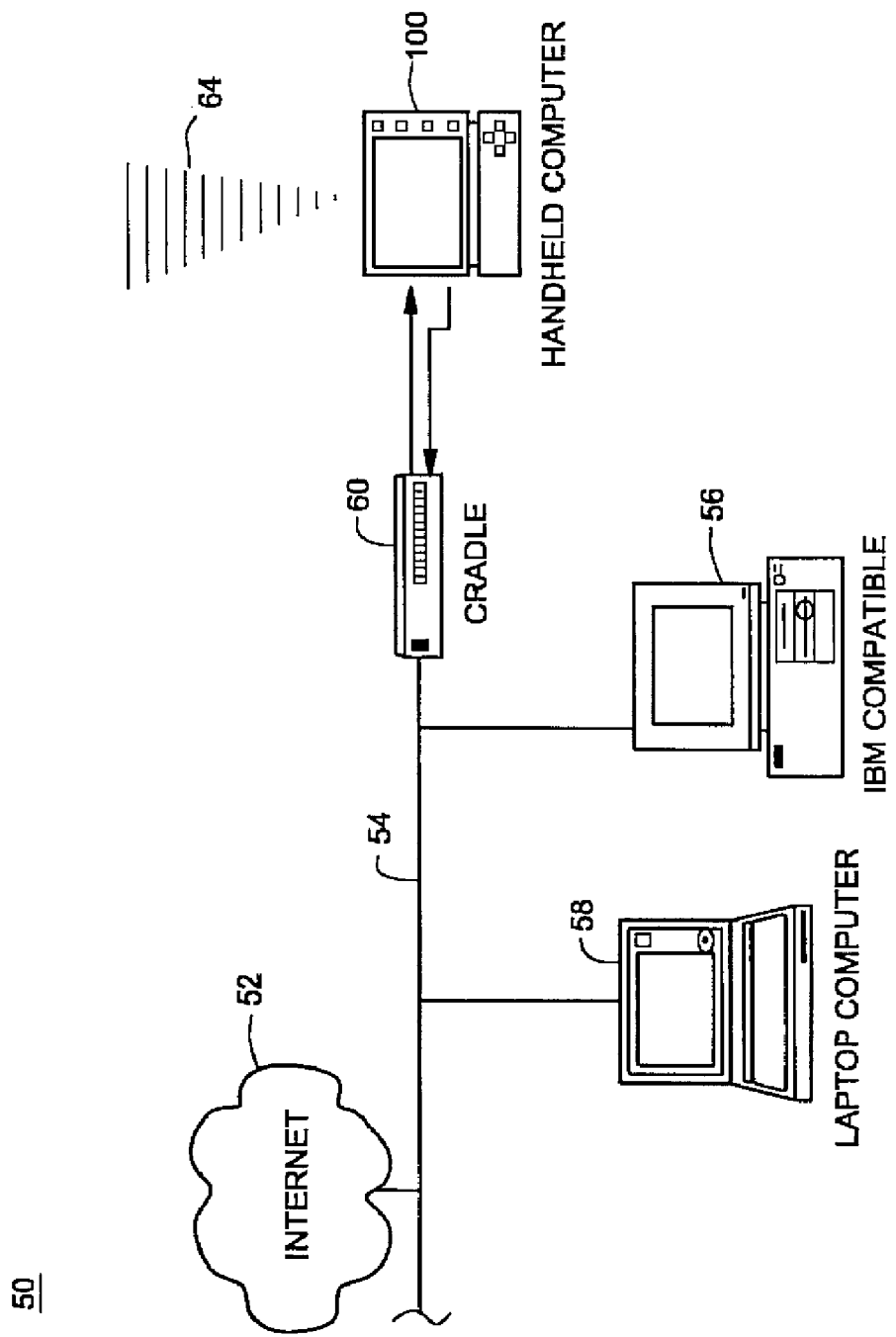
FIG. 1 is system illustration of a palmtop or "palm sized" computer system connected to other computer systems and the Internet via a cradle device.

FIG. 1 illustrates a system 50 that can be used in conjunction with the intelligent battery life enhancement features of the present invention. System 50 is exemplary and comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a palm top ("palm-sized") portable computer system 100 of the present invention. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

Figure 2A:
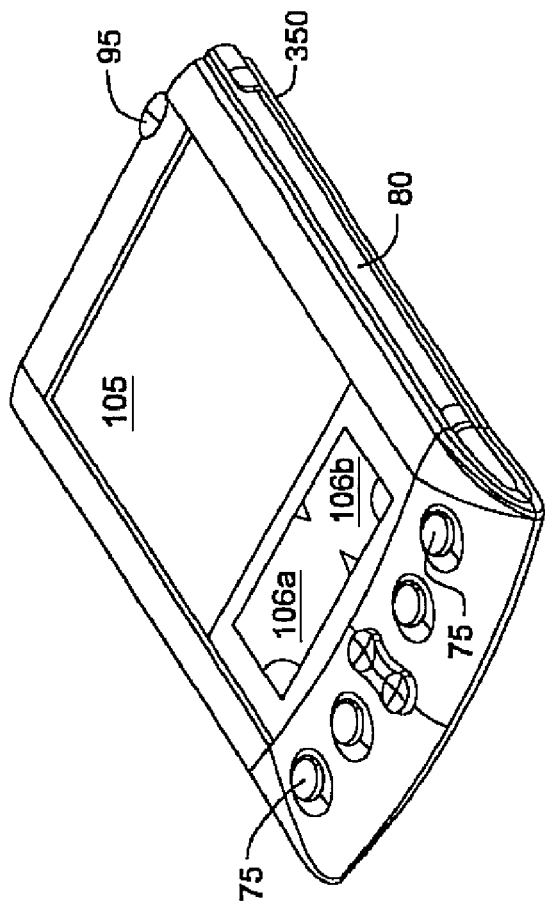
FIG. 2A is a top side perspective view of a palmtop computer system that can be used in one embodiment of the present invention.

FIG. 2A is a perspective illustration of the top face 100a of one embodiment of the palmtop computer system that can be used in one embodiment of the present invention. The top face 110a contains a display screen 105 surrounded by a bezel or cover. A removable stylus 80 is also shown. The display screen 105 contains a transparent touch screen (digitizer) able to register contact between the screen and the tip of the stylus

80. The stylus 80 can be of any material to make contact with the screen 105. As shown in FIG. 2A, the stylus 80 is inserted into a receiving slot or rail 350. Slot or rail 350 acts to hold the stylus when the computer system 100a is not in use. Slot or rail 350 may contain switching devices for automatically powering down and automatically power up computer system 100a based on the position of the stylus 80. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alpha characters therein for automatic recognition (and generally not used for recognizing numeric characters) and region 106b is for the drawing of numeric characters therein for automatic recognition (and generally not used for recognizing numeric characters). The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 5:
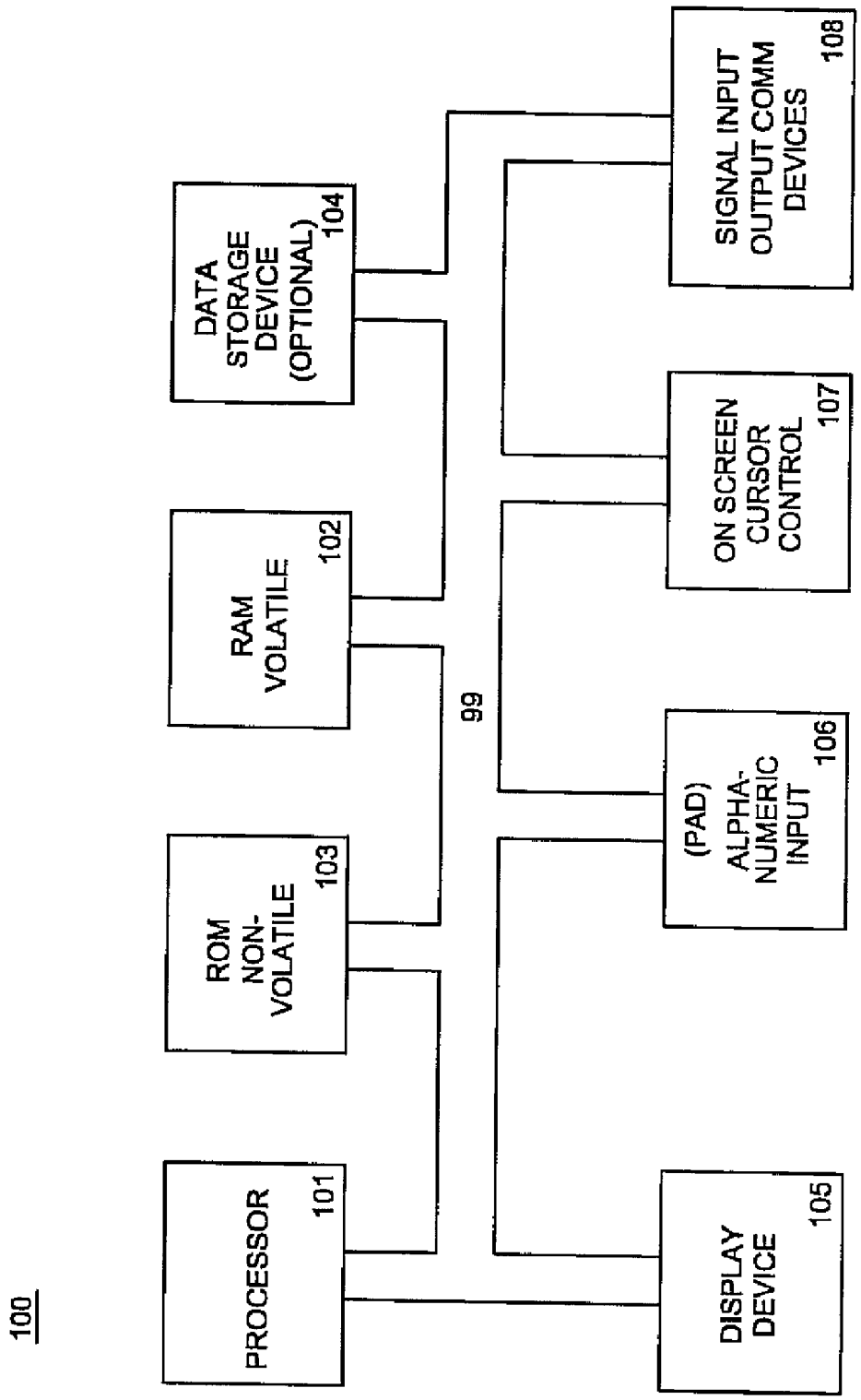
FIG. 5 is a logical block diagram of the palmtop computer system in accordance with an embodiment of the present invention.

The digitizer 160 records both the (x, y) coordinate value of the current location of the stylus and also simultaneously records the pressure that the stylus exerts on the face of the digitizer pad. The coordinate values (spatial information) and pressure data are then output on separate channels for sampling by the processor 101 (FIG. 5). In one implementation, there are roughly 256 different discrete levels of pressure that can be detected by the digitizer 106. Since the digitizer's channels are sampled serially by the processor, the stroke spatial data are sampled "pseudo" simultaneously with the associated pressure data. The sampled data is then stored in a memory by the processor 101 (FIG. 5) for later analysis.

Figure 3:
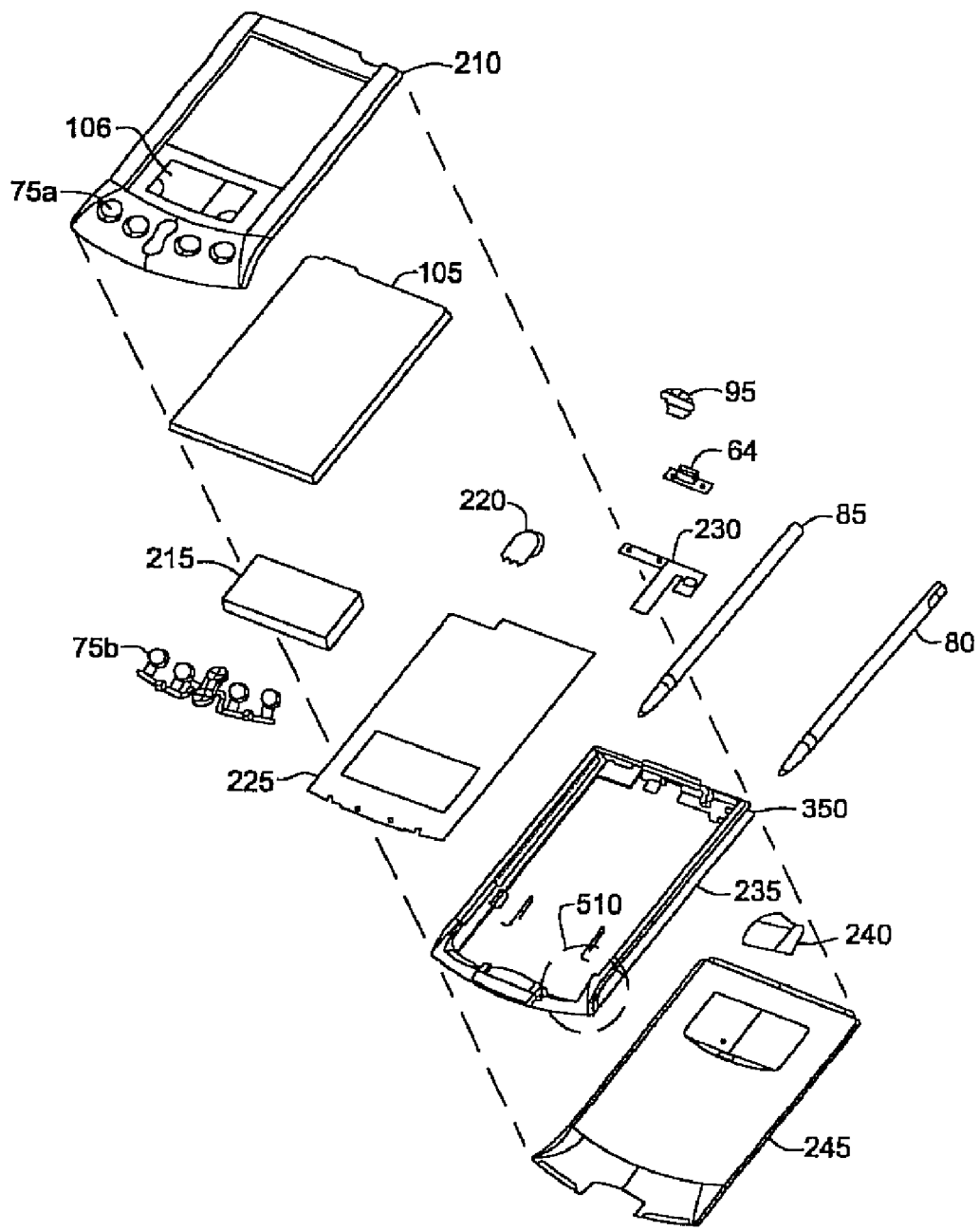
FIG. 3 is an exploded view of the components of the palmtop computer system of FIG. 2A.

FIG. 2B illustrates the bottom side 100b of one embodiment of the palmtop computer system. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc. In FIG. 2B is also shown the stylus receiving slot or rail 350. FIG. 3 is an exploded view of the palmtop computer system 100 in accordance with one implementation of the present invention. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. In one embodiment, the display 105 is a flat panel multi-mode display capable of both monochrome and color display modes.

The touch screen can be a digitizer. A battery 215 provides electrical power. Replaceable cells or rechargeable batteries can be used. Well known electronics coupled to the battery 215 can detect the energy level of the battery 215. This information can be sampled by the computer system 110 (FIG. 5) using well known techniques. The digitizer of FIG. 3 can be implemented using well known devices, for instance, using the ADS-7846 device by Burr-Brown that provides separate channels for spatial stroke information and pressure information. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is shown. The midframe 235 contains the stylus receiving slot or rail 350.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation, the Mobitex wireless communication system is used to provide two way communication between system 100 and other networked computers and/or the Internet via a proxy server. In other embodiments, TCP protocol can be used.

Figure 4:
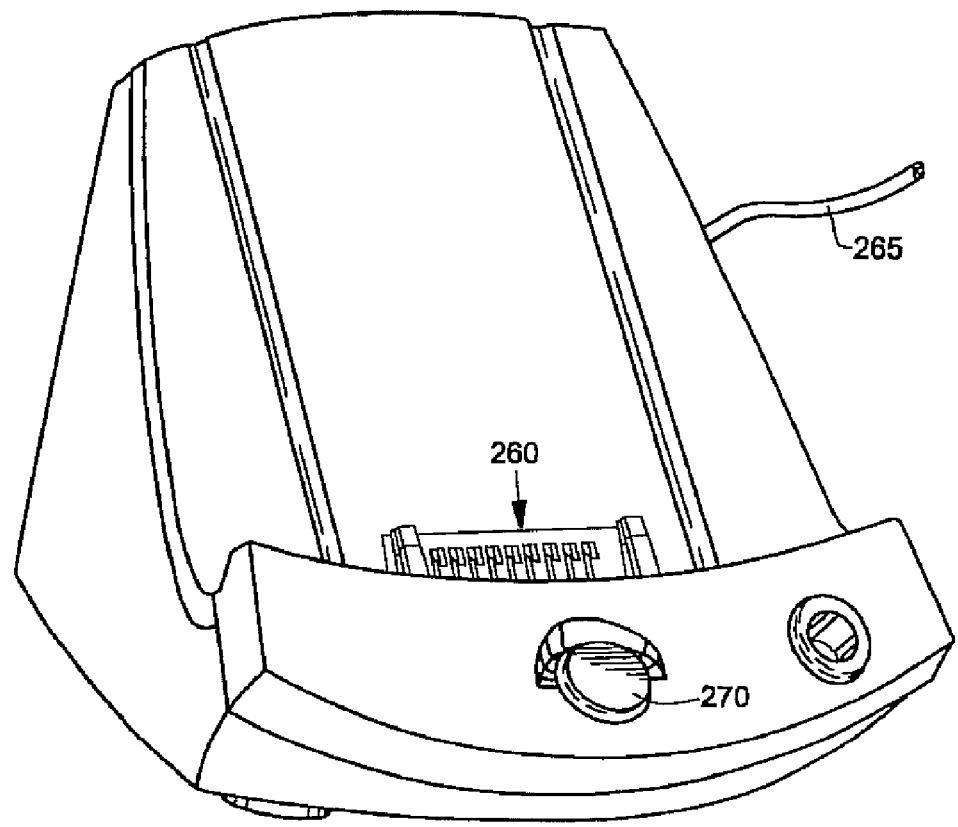
FIG. 4 is a perspective view of the cradle device for connecting the palmtop computer system to other systems via a communication interface.

FIG. 4 is a perspective illustration of one embodiment of the cradle 60 for receiving the palmtop computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265.

FIG. 5 illustrates circuitry of computer system 100, some of which can be implemented on PC board 225. The computer system 100 can be used to perform the intelligent battery life enhancement processes of the present invention. Computer system 100 includes an address/data bus 99 for communicating information, a central processor 101 coupled with the bus 99 for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 110 also includes an optional data storage device 104 (e.g., memory stick) coupled with the bus 99 for storing information and instructions. Device 104 can be removable. As described above, system 100 also contains a display device 105 coupled to the bus 99 for displaying information to the computer user. PC board 225 can contain the processor 101, the bus 99, the ROM 103 and the RAM 102.

Also included in computer system 110 of FIG. 5 is an alphanumeric input device 106 which in one implementation is a handwriting recognition pad ("digitizer") having regions 106a and 106b (FIG. 2A), for instance. Device 106 can communicate information (spatial data and pressure data) and command selections to the central processor 101. System 110 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact and the pressure of the contact. The display device 105 utilized with the computer system 110 may be a liquid crystal device, cathode ray tube (CRT), field emission device (FED, also called flat panel CRT) or other display device suitable for creating graphic images and alphanumeric characters recognizable to the user. In one embodiment, the display 105 utilizes color sequential scanning but could also utilize color filters with subpixels.

Signal communication device 108, also coupled to bus 99, can be a serial port for communicating with the cradle 60. Device 108 can also include an infrared communication port.

Figure 6:
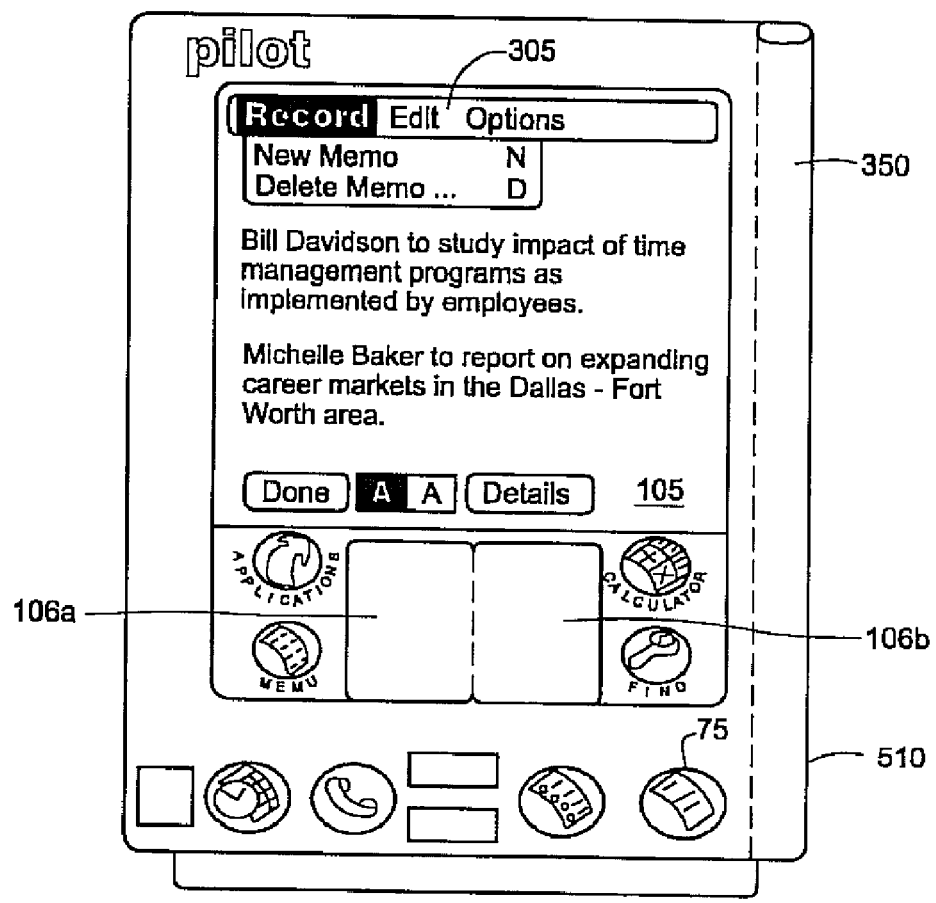
FIG. 6 is a front view of a palm top computer system illustrating the display screen, digitizer regions and an exemplary menu of a text display application.

FIG. 6 is a front view of the palmtop computer system 100 with a menu bar 305 open displaying a pull down window having several selections that can be made by the user. Buttons on screen 105 can be selected by the user directly tapping on the screen location of the button with stylus 80. Also shown are two regions of digitizer 106a and 106b. Region 106a is for receiving user stroke data (and pressure data) for alphabet characters, and typically not numeric characters, and region 106b is for receiving user stroke data (and pressure data) for numeric data, and typically not for alphabetic characters. Physical buttons 75 are also shown. Although different regions are shown for alphabetic and numeric characters, the device is also operable within a single region that recognizes both alphabetic and numeric characters. Also shown in FIG. 6 is the position of the stylus receiving slot or rail 350. It is appreciated that while the stylus receiving slot or rail 350 is depicted on the left of the computer 100, it can also be deployed on the right or along the top edge or along the bottom edge.

It is appreciated that, in one embodiment, the digitizer region 106a and 106b are separate from the display screen 105 and therefore does not consume any display area.

Intelligent Battery Life Enhancement of the Present Invention

In accordance with embodiments of the present invention, the display mode of the multi-mode display unit 105 can be altered in response to detected low battery life. By changing display modes in this fashion, the remaining battery life of the portable electronic device can be extended. Although the PDA device 100 has been illustrated as one example, it is appreciated that any of a number of portable or otherwise battery powered electronic devices can be used within the spirit and scope of the present invention, e.g., electronic pagers, cell phones, computer systems, PDAs, etc., can utilize the intelligent battery enhancement processes of the present invention. In one embodiment, any display mode changes are performed in response to a user selection where the user is queued to make a selection after a low battery level is detected by the electronic device. In another embodiment, all changes are performed automatically by the electronic device without requiring a user selection. In yet another mode, a user selection is requested, but if the battery level reaches a critical low level and the user has not yet made a low power selection, then the electronic device automatically changes to a low power display mode.

Figure 7:
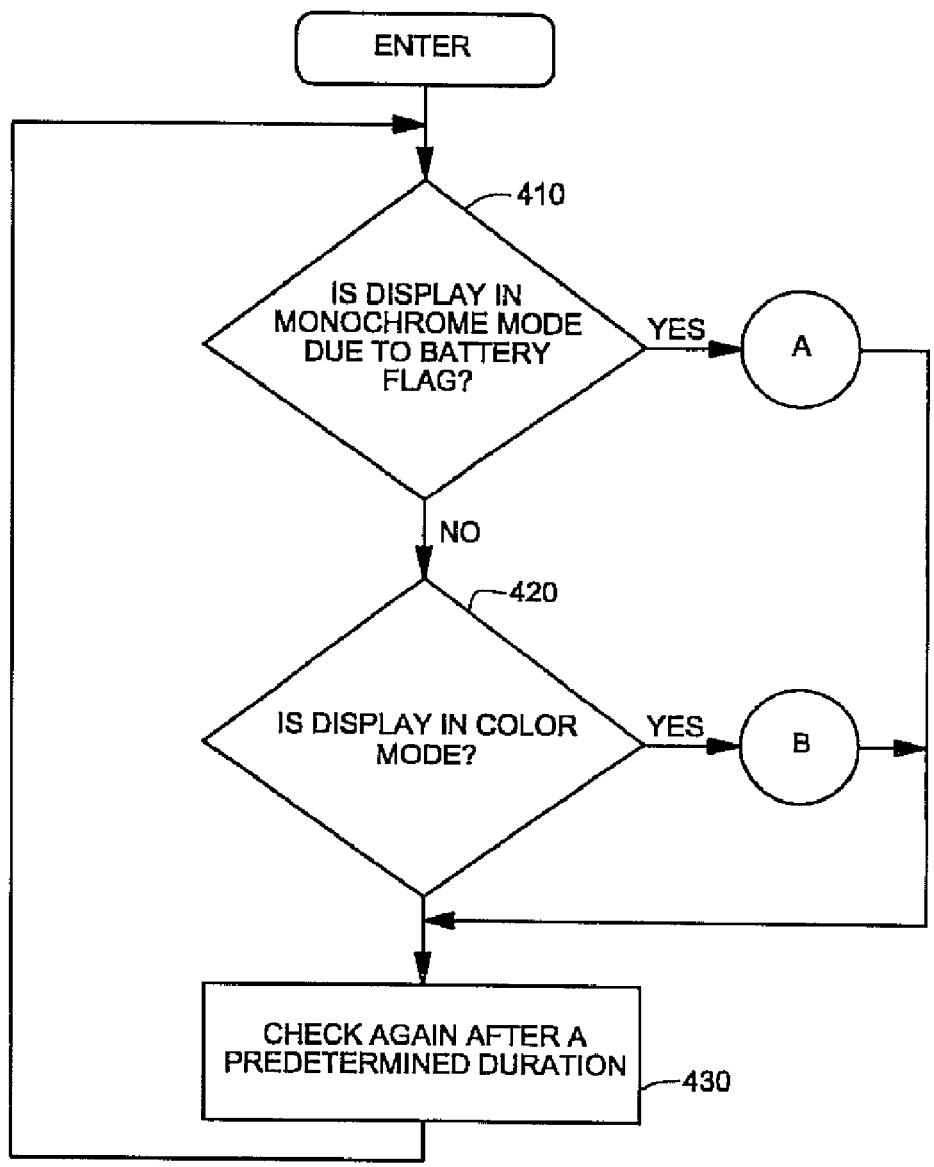
FIG. 7, FIG. 8 and FIG. 9 are flow diagrams illustrating one embodiment of the present invention for intelligently enhancing the battery life of a battery powered computer system.
Figure 8:
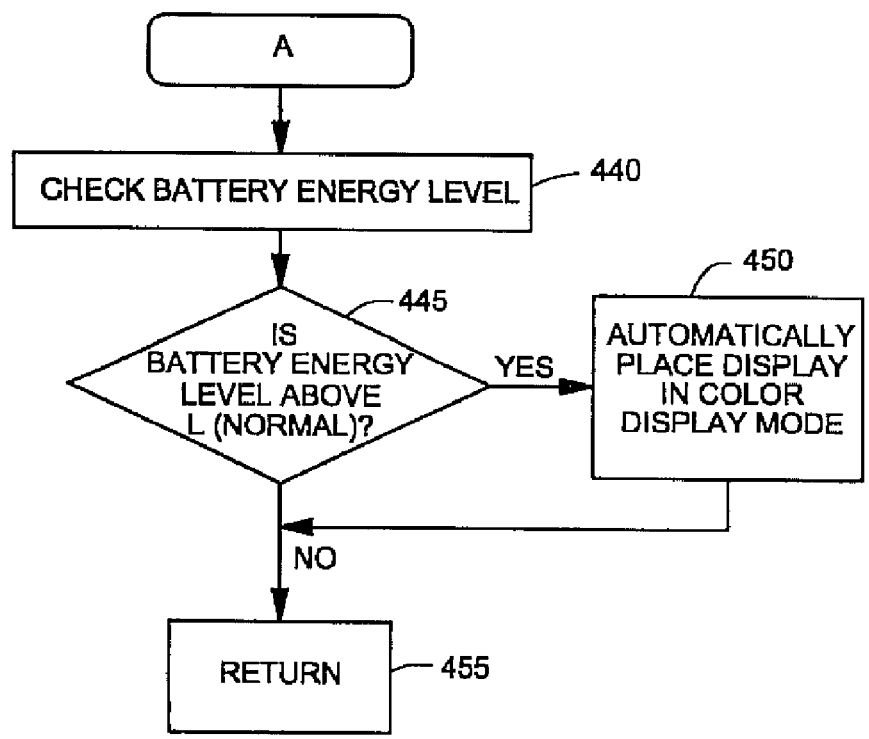
Figure 9:
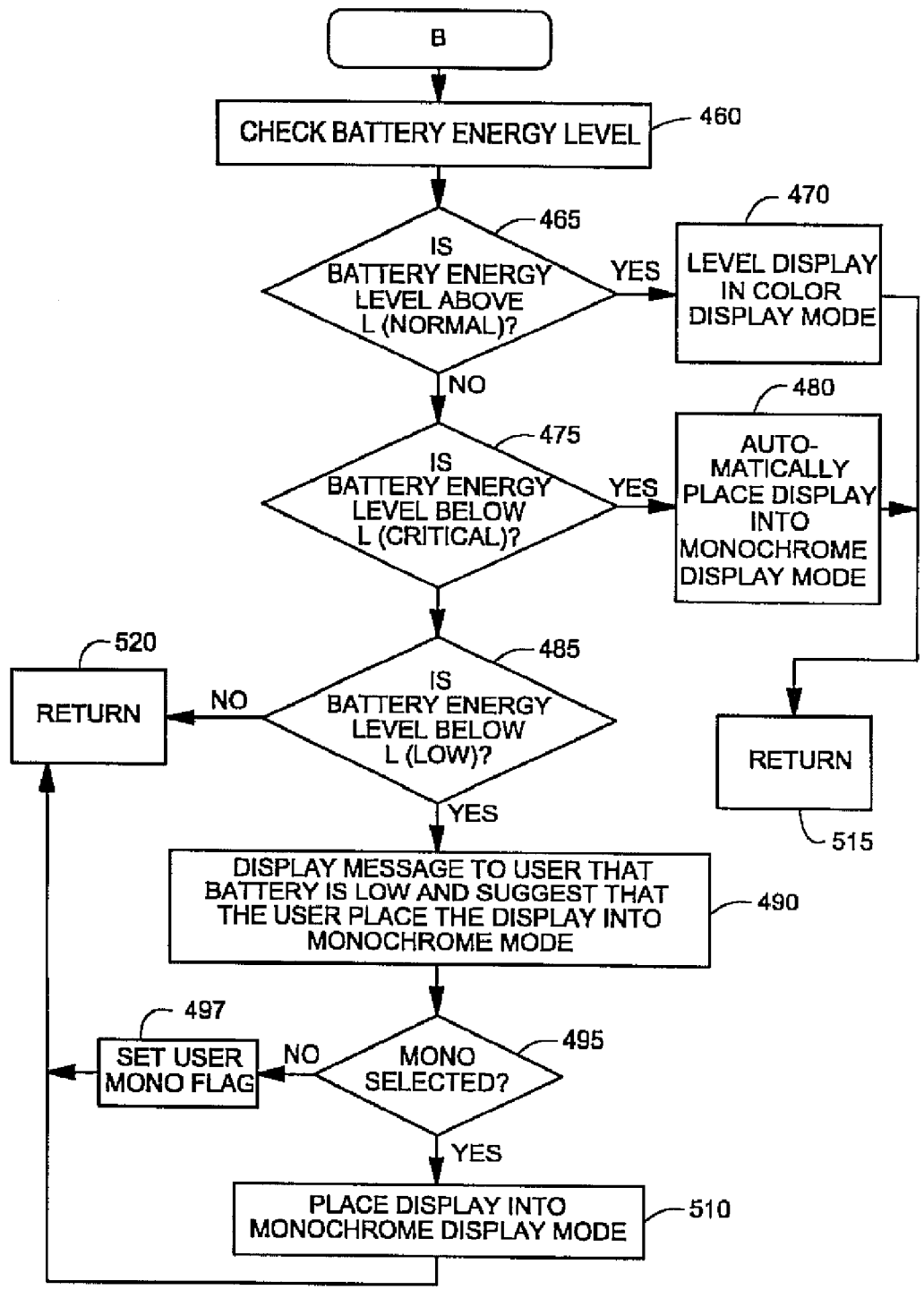

FIG. 7, FIG. 8 and FIG. 9 illustrate steps of a flow diagram that represents one cyclic process 400 in accordance with an embodiment of the present invention. It is appreciated that process 400 can be implemented, in one embodiment, as processor instructions stored in computer readable memory units of the electronic device. At step 410, the device 100 checks if the multi-mode display 105 is already in the monochrome display mode. If the device 100 places the display 105 in the monochrome display mode, then a battery flag is also set concurrently. Alternatively, a display mode flag can be checked at step 410. If the display is currently in monochrome display mode, then process "A" is entered. At step 420, the device 100 checks if the multi-mode display 105 is in color display mode. In one embodiment, the same flag can be used to make this determination and, in fact, step 420 can also be a default condition based on any negative determination made at step 410. If the display 105 is in color display mode, then process "B" is entered. At the completion of either process, A or B, step 430 is entered. After some predetermined duration, step 410 is then entered again.

FIG. 8 illustrates the steps of process A which represents the case of the multi-mode display being in monochrome display mode. At step 440, the device 100 checks the battery energy level of battery 215. As a result of the check, a certain energy level value is given, e.g., the current energy level. This value can be expressed as a voltage, a percentage, a time remaining, etc., or any other value appropriate to represent the remaining energy level of battery 215 as indicated at the time step 440 is performed. At step 445, a check is made if the current energy level is above a predetermined normal level. Any value can be assigned to the normal level. In one embodiment, it is 20 percent of the total battery energy capacity.

If the current energy level is above this predetermined normal level, then at step 450, the multi-mode display is automatically placed into the color display mode. The display mode flag and any battery flags are also set to indicate the color display mode. Step 450 is provided to return the device to color display mode when adequate battery energy is detected. Since the display quality is increased, there is no need to ask the user before automatically returning to the color display mode. After step 450, process A returns. At step 445 of FIG. 8, if it is determined that the current energy level of the battery 215 is below the normal level, then process A returns directly and the multi-mode display 105 remains in the monochrome display mode.

FIG. 9 illustrates the steps of process B which represents the case of the multi-mode display being in the color display mode. At step 460, the device 100 checks the battery energy level of battery 215. As a result of the check, a certain energy level value is given, e.g., the current energy level. This value can be expressed as a voltage, a percentage, a time remaining, etc., or any other value appropriate to represent the remaining energy level of battery 215 as indicated at the time step 460 is performed. At step 465, a check is made if the current energy level is above the predetermined normal level. Any value can be assigned to the normal level. If so, then at step 470, the display is left in the color display mode and process B returns.

Figure 11:
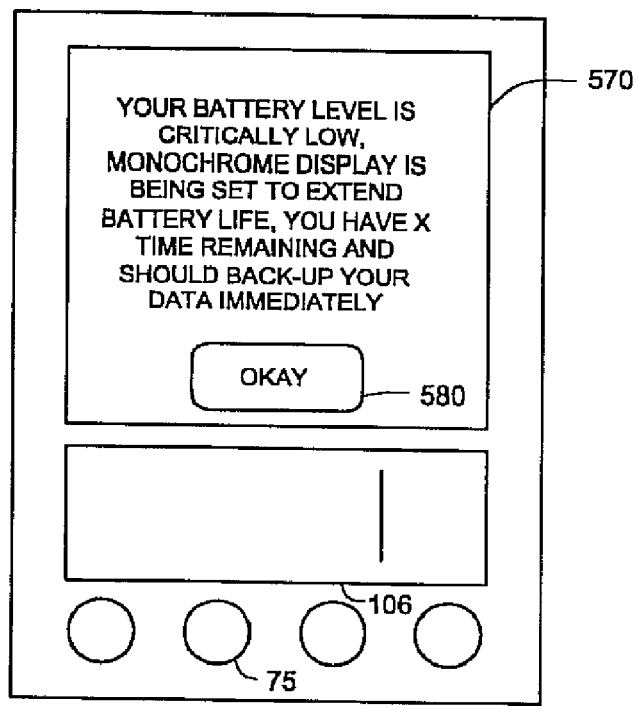
FIG. 11 illustrates another exemplary user message displayed in one embodiment of the present invention indicating that monochrome display mode has automatically been entered to intelligently enhance the battery life of a battery powered computer system.

At step 475, a check is made if the current energy level is below a predetermined critical level. Any value can be assigned to the critical level that is below the normal level. In one embodiment, the critical level is selected such hardly any battery energy is remaining in the device 100. In this case, at step 480, the multi-mode display 105 is automatically placed into the monochrome display mode because the monochrome display mode consumes less energy than the color display mode. Flags are also set indicating the setting of monochrome display mode. At step 480, the device can also generate a user message as shown in FIG. 11. This message 570 informs the user that the battery energy level is critically low and that monochrome mode is being entered in order to extend remaining battery life. Optionally, at step 480, the message 570 (FIG. 11) can also indicate the estimated time, X, remaining in the battery until forced power down. After step 480, process B returns.

Figure 10:
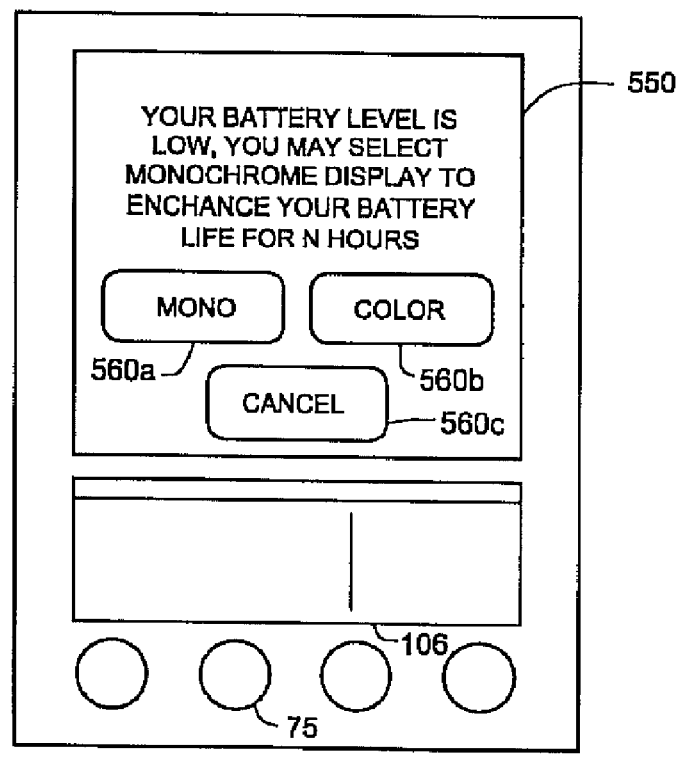
FIG. 10 illustrates an exemplary user message displayed in one embodiment of the present invention for user selectably entering monochrome display mode to intelligently enhance the battery life of a battery powered computer system.

At step 485 of FIG. 9, a check is made if the current energy level is below a predetermined low level. Any value can be assigned to the low level that is below the normal level and above the critical level. The low level and the normal level can also be the same level in one embodiment. If the current level is not below the low level, then process B returns. If the current level is below the low level (and not below the critical level), then step 490 is entered as long as the user mono flag is reset. If the user mono flag is set, then step 520 is entered. At step 490, a message (as shown in FIG. 10) is displayed to the user informing them that the battery level is low and further giving the user a choice between remaining in color display mode (display button 560b) or switching to monochrome mode (display button 560*a*). If they switch to monochrome mode, the message 550 can also give an estimate of the battery life remaining, N.

At step 495 of FIG. 9, a check is made if the user selected monochrome mode, e.g., button 560*a*. If so, then at step 510, the multi-mode display 105 is placed into monochrome display mode because the monochrome display mode consumes less energy than the color display mode. Flags are also set indicating the setting of monochrome display mode. Process B then returns. At step 495, if the user did not select monochrome mode, e.g., button 560*b* or button 560*c*, then at process 497 the user mono flag is set and process B returns. The user mono flag does not reset until some long period of time so that the user is not continually bothered with the message at 490.

It is appreciated that process 400 does not replace any other battery life warning processes that may also reside within device 100. For instance, if the device 100 is in monochrome display mode and the battery energy level of device 100 falls below the critical level, a critically low battery warning may be given to the user.

Figure 12:
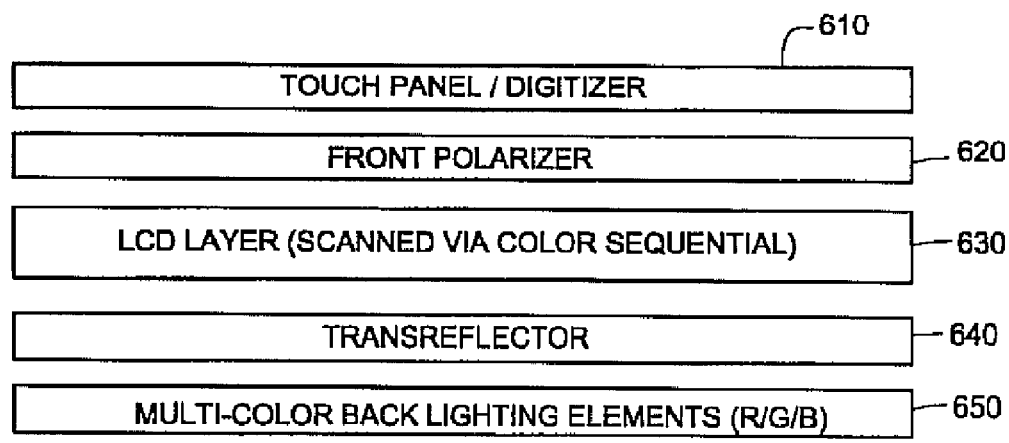
FIG. 12 is a cross sectional diagram of exemplary layers of a multi-mode flat panel display screen in accordance with one embodiment of the present invention.

FIG. 12 illustrates a multi-mode display that can be used in accordance with one embodiment of the present invention. It is appreciated that any multi-mode display device can be used by the present invention where color display consumes more energy than the monochrome display. The flat panel multi-mode display 105*a* of FIG. 12 is shown as an example only. Display 105*a* is a liquid crystal display that utilizes sequential color scanning techniques. In accordance with well known sequential color scanning, multi-color back lighting elements 650 are energized in synchronization with color data of the color being presented to the pixels of the LCD layer 630. In other words, the red elements are excited in synchronization with the red data, the blue elements are then excited in synchronization with the blue data, and then the green elements are excited in synchronization with the green data. This can occur in any order.

A transreflector 640 is positioned between the back lighting elements 650 and the LCD layer 650. In this embodiment, the transreflector 640 is also a rear polarizer. In an alternative embodiment, a separate rear polarizer can also be used (if the transreflector does not double as a polarizer) and the polarizer layer (not shown) would be placed adjacent to the transreflector layer 640. A front polarizer layer 620 is also used and is positioned between the LCD layer 630 and a touch panel layer 610 (digitizer). It is appreciated that in color mode, the multi-color back lighting elements 650 are energized. It is also appreciated that in monochrome mode, the multi-color back lighting elements 650 are disabled (thereby saving power) and the transreflector 640 provides the appropriate light energy for viewing an image within the LCD layer 630. In color display mode, the transreflector 640 also provides the appropriate light energy for viewing an image within the LCD layer 630 for environments having bright light, e.g., sunny viewing conditions.

In monochrome mode, the color data for a given pixel is averaged to create one gray scale. The pixel scanning speed is also reduced by ⅓ and the multi-color back lighting elements 650 are disabled.

It is appreciated that the embodiments of the present invention can be applied to any transreflective display technology that utilizes a back light that can be selectively turned on and off. For instance, the embodiments of the present invention can be applied to a color display that is transreflective and has a back lighting element. The back lighting element can be turned off to save power. In this case, the display is in color when the back lighting element is on and also in color when the back lighting element is off. Also, the embodiments of the present invention can be applied to a monochrome display that is transreflective and has a back lighting element. The back lighting element can be turned off to save power. In this case, the display is in monochrome when the back lighting element is on and also in monochrome when the back lighting element is off.

The preferred embodiment of the present invention, a method and system for providing user selectable display modes for a multi-mode display screen in order to intelligently enhance battery life for a battery powered electronic device, is thus described. While the present invention has been described in particular embodiments, it should be appreciated that the present invention should not be construed as limited by such embodiments, but rather construed according to the below claims.

What is claimed is:

1. In a portable electronic device, a method of enhancing battery life comprising:
   detecting a battery energy level of said portable electronic device comprises a first predetermined level, wherein said portable electronic device comprises a display device for providing a first display mode and a second display mode;
   in response to said detecting said battery energy level of said portable electronic device below said first predetermined level, placing said display device into said first display mode to enhance remaining battery life of said portable electronic device wherein said first display mode is a power saving mode;
   in response to detecting said battery energy level of said portable electronic device above said first predetermined level and below a predetermined level, activating a second display mode, wherein said first and said second display modes are independent of an intensity of an illumination system for said display device.

2. The method as recited in claim 1 wherein said placing said display device into said first display mode is performed automatically in response to said detecting said battery energy level of said portable electronic device below said first predetermined level.

3. The method as recited in claim 1 wherein said display device comprises a backlighting element.

4. The method as recited in claim 1
   wherein placing said display device into said first display mode is performed automatically.

5. The method as recited in claim 1
   wherein placing said display device into said second display mode is performed automatically.

6. The method as recited in claim 1 further comprising:
   detecting said battery level energy level of said portable electronic device above said predetermined level; and
   in response to said detecting said battery level energy level of said portable electronic device above said predetermined level, automatically placing said display device into said second display mode.

7. A portable electronic device comprising:
   a battery;
   a processor couple to a bus;
   an input device couple to said bus;
   a display device coupled to said bus, said display device for providing a first display mode and a second display mode, wherein said first display mode is a power saving mode;

a memory unit coupled to said bus wherein said memory unit comprises processor instructions that when executed implement a method of enhancing battery life, said method comprising:

detecting a battery energy level of said portable electronic device below a first predetermined level;

in response to said detecting said battery energy level of said portable electronic device below said first predetermined level, placing said display device into said first display mode to enhance remaining battery life of said portable electronic device;

in response to detecting said battery energy level of said portable electronic device above said first predetermined level and below a predetermined level, activating a second display mode, wherein said first and said second display modes are independent of an intensity of an illumination system for said display device.

8. The portable electronic device of claim 7 wherein said placing said display device into said first display mode is performed automatically in response to said detecting said battery energy level of said portable electronic device below said first predetermined level.

9. The portable electronic device of claim 7 wherein said display device comprises a backlighting element.

10. The portable electronic device of claim 7 wherein placing said display device into said first display mode is performed automatically.

11. The portable electronic device of claim 7 wherein placing said display device into said second display mode is performed automatically.

12. The portable electronic device of claim 7 wherein said method further comprises:

detecting said battery level energy level of said portable electronic device above said predetermined level; and in response to said detecting said battery level energy level of said portable electronic device above said predetermined level, automatically placing said display device into said second display mode.

13. A computer-usable medium comprising computer-readable program code embodied therein for causing a computer system to perform a method of enhancing battery life in a portable electronic device, said method comprising:

detecting a battery energy level of said portable electronic device below a first predetermined level, wherein said portable electronic device comprises a display device for providing a first display mode and a second display mode;

in response to said detecting said battery energy level of said portable electronic device below said first predetermined level, placing said display device into said first display mode to enhance remaining battery life of said portable electronic device wherein said first display mode is a power saving mode;

in response to detecting said battery energy level of said portable electronic device above said first predetermined level and below a predetermined level, displaying a message on said display device indicating a low battery level, wherein said first and said second display modes are independent of an intensity of an illumination system for said display device.

14. The computer-usable medium of claim 13 wherein said placing said display device into said first display mode is performed automatically in response to said detecting said battery energy level of said portable electronic device below said first predetermined level.

15. The computer-usable medium of claim 13 wherein placing said display device into said first display mode is performed automatically.

16. The computer-usable medium of claim 13 wherein placing said display device into said second display mode is performed automatically.

17. The computer-usable medium of claim 13 wherein said method further comprises:

detecting said battery level energy level of said portable electronic device above said predetermined level; and in response to said detecting said battery level energy level of said portable electronic device above said predetermined level, automatically placing said display device into said second display mode.

* * * * *

UNITED STATES PATENT AND TRADEMARK OFFICE
CERTIFICATE OF CORRECTION

PATENT NO. : 8,049,744 B2
APPLICATION NO. : 12/613354
DATED : November 1, 2011
INVENTOR(S) : Shawn Gettemy et al.

Page 1 of 1

It is certified that error appears in the above-identified patent and that said Letters Patent is hereby corrected as shown below:

In column 10, line 23, in Claim 1, delete "comprises" and insert -- below --, therefor.

In column 10, line 54, in Claim 6, delete "battery level energy level" and insert -- battery energy level --, therefor.

In column 10, line 56, in Claim 6, delete "battery level energy level" and insert -- battery energy level --, therefor.

In column 10, line 62, in Claim 7, delete "couple" and insert -- coupled --, therefor.

In column 10, line 63, in Claim 7, delete "couple" and insert -- coupled --, therefor.

In column 11, line 34, in Claim 12, delete "battery level energy level" and insert -- battery energy level --, therefor.

In column 11, line 36, in Claim 12, delete "battery level energy level" and insert -- battery energy level --, therefor.

In column 12, line 35, in Claim 17, delete "battery level energy level" and insert -- battery energy level --, therefor.

In column 12, line 37, in Claim 17, delete "battery level energy level" and insert -- battery energy level --, therefor.

Signed and Sealed this
Seventh Day of August, 2012

David J. Kappos
*Director of the United States Patent and Trademark Office*